US012658381B2

(12) United States Patent
Lin et al.

(10) Patent No.: US 12,658,381 B2
(45) Date of Patent: Jun. 16, 2026

(54) TRANSFER APPARATUS FOR DUAL-POWER TRANSFER SWITCH

(71) Applicant: ABB S.P.A., Milan (IT)

(72) Inventors: Jianqi Lin, Jiangmen (CN); Wensheng Liu, Jiangmen (CN); Jien Su, Jiangmen (CN)

(73) Assignee: ABB S.P.A., Milan (IT)

( * ) Notice: Subject to any disclaimer, the term of this patent is extended or adjusted under 35 U.S.C. 154(b) by 310 days.

(21) Appl. No.: 18/548,809

(22) PCT Filed: Apr. 28, 2021

(86) PCT No.: PCT/CN2021/090729
§ 371 (c)(1),
(2) Date: Sep. 1, 2023

(87) PCT Pub. No.: WO2022/226844
PCT Pub. Date: Nov. 3, 2022

(65) Prior Publication Data

US 2024/0153720 A1 May 9, 2024

(51) Int. Cl.
*H01H 9/26* (2006.01)

(52) U.S. Cl.
CPC .................................... *H01H 9/26* (2013.01)

(58) Field of Classification Search
CPC .. H01H 9/00; H01H 9/20; H01H 9/22; H01H 9/262; H01H 9/26; H01H 3/22; H01H 71/10; H01H 71/1009; H01H 71/52; H01H 2300/018
USPC ........................................................ 200/5 B
See application file for complete search history.

(56) References Cited

U.S. PATENT DOCUMENTS

2019/0341203 A1 11/2019 Liu et al.

FOREIGN PATENT DOCUMENTS

| | | | | |
|---|---|---|---|---|
| CN | 2932595 Y | 8/2007 | | |
| CN | 201167040 Y | 12/2008 | | |
| CN | 201266582 Y | 7/2009 | | |
| CN | 203983198 U | 12/2014 | | |
| CN | 104766729 A | 7/2015 | | |
| CN | 105513842 A | 4/2016 | | |
| CN | 105513847 B | 1/2018 | | |
| CN | 110120310 A | 8/2019 | | |
| CN | 209785777 U | 12/2019 | | |
| CN | 113838693 A | * 12/2021 | | H01H 3/50 |

* cited by examiner

*Primary Examiner* — Anthony R Jimenez
(74) *Attorney, Agent, or Firm* — Greenberg Traurig, LLP

(57) ABSTRACT

A transfer apparatus for a dual-power transfer switch and an associated dual-power transfer switch. The transfer switch includes a pair of pushing members adapted to be moved in opposite directions to control circuit breakers for the dual-power transfer switch in a mutually different manner; a transmission arm rotatably arranged between the pair of pushing members; a pair of pins arranged on radial ends of the transmission arm; and a pair of elastic reset components arranged on the pair of pushing members.

20 Claims, 4 Drawing Sheets

TRANSFER APPARATUS FOR DUAL-POWER TRANSFER SWITCH

CROSS-REFERENCE TO RELATED APPLICATIONS

This is a national stage application claiming priority to International patent application Serial No.: PCT/CN2021/090729, filed on Apr. 28, 2021; which is herein incorporated by reference in its entirety.

FIELD

Embodiments of the present disclosure generally relate to a dual-power transfer switch, and more specifically, to a transfer apparatus for a dual-power transfer switch and an associated assembling method.

BACKGROUND

A dual-power transfer switch, also called dual-power transfer switching equipment, is an electrical switch that switches a load between two sources. Some dual-power transfer switches are manual, in that an operator effects the transfer by throwing a switch, while others are automatic and trigger when they sense one of the sources has lost or gained power. The dual-power transfer switch is often installed where a backup generator is located, so that the generator may provide temporary electrical power if the utility source fails.

There are three different classes of dual-power transfer switches, i.e., Class CC, Class PC and Class CB. The Class CC is a transfer switch that is capable of making and withstanding, but is not intended for breaking short-circuit currents and is based on devices fulfilling the requirements of some standards, such as IEC 60947-4-1. The Class PC is a transfer switch that is capable of making and withstanding, but is not intended for breaking short-circuit currents and is based on devices fulfilling the requirements of some standards, such as IEC 60947-3. The Class CB is a transfer switch that is capable of making, withstanding and is intended for breaking short-circuit currents and is provided with over-current releases and is based on devices fulfilling the requirements of some standards, such as IEC 60947-2.

SUMMARY

Embodiments of the present disclosure provide a transfer apparatus for a dual-power transfer switch and associated transfer switch.

In a first aspect, a transfer apparatus for a dual-power transfer power switch is provided. The transfer switch comprises a pair of pushing members adapted to be moved in opposite directions to control circuit breakers for the dual-power transfer switch in a mutually different manner, each of the pair of pushing members comprising a limiting slot; a transmission arm rotatably arranged between the pair of pushing members; a pair of pins arranged on radial ends of the transmission arm and each adapted to slide in the respective limiting slot with a rotation of the transmission arm to drive the respective pushing member to move; and a pair of elastic reset components arranged on the pair of pushing members and each adapted to be pressed by the respective pin during sliding of the pin to ensure the respective circuit breaker to be reset or switched into an open state with both of the circuit breakers being in the open state.

With the transfer apparatus according to embodiments of the present disclosure, the tripped circuit breaker can be reset so that both of the circuit breakers are in the open state, which significantly improve the safety performance of the dual-power transfer switch. Furthermore, because only an elastic reset component is needed to be arranged on the pushing member, the conventional dual-power transfer switch can be easily to be modified to obtain a more reliable performance.

In some embodiments, each of the pair of elastic reset components comprises a wire spring arranged on the respective pushing member and comprising an inclined section inclined to gradually approach another pushing member in a first moving direction along which the pushing member is moved to cause the respective circuit breaker to be switched from a closed state to the open state; and a bent protrusion protruding from the inclined section and adapted to be pressed by the respective pin during the sliding of the pin. This can achieve the above functions with a simple structure of the transfer apparatus.

In some embodiments, the bent protrusion comprises a first inclined portion bent to have a first angle with the inclined section and adapted to be pressed by the pin when the pin moves in a first direction to allow the pin to apply the force to the handle; and a second inclined portion bent to have a second angle larger than the first angle with the inclined section and adapted to be pushed away by the pin when the pin moves in a second direction opposite to the first direction to allow the pin to cross the bent protrusion without causing the respective pushing member to move. This arrangement can ensure that one inclined portion can be pressed against but not pushed away by the pin moving in a first direction while another inclined portion can be directly pushed away by the pin moving in a second direction opposite to the first direction.

In some embodiments, each of the pairs of pins is further adapted to, when the corresponding circuit breaker is in the open state, push away and cross the bent protrusion via the first inclined portion with the further rotation of the transmission arm. This arrangement can allow the pin to move further to an end of the limiting slot to thereby ensure the respective circuit breaker to be in the open state.

In some embodiments, the wire spring further comprises a first bent section bent back from a bending end of the inclined section and extending in a moving direction of the pushing member, the bending end of the inclined section being further away from another pushing member than a movable end of the inclined section away from the bending end. This arrangement can cause the wire spring to provide a suitable deformation and elasticity to thereby improve the performance of the transfer apparatus.

In some embodiments, each of the pair of elastic reset components further comprises a first fastener arranged to pivotably fix a pivotable end of the first bent section away from the bending end of the inclined section; and a second fastener arranged at the movable end of the inclined section and adapted to allow the movable end to move along an inclined direction of the inclined section. This arrangement can cause the wire spring to provide a suitable deformation and elasticity to thereby improve the performance of the transfer apparatus.

In some embodiments, each of the pair of elastic reset components further comprises a limiting protrusion protruding from the respective pushing member and arranged between the first bent section and the inclined section, the limiting protrusion adapted to stop the first bent section when the pin is in contact with the first inclined portion. The limiting protrusion can increase the force applied to the handle by the pin via the wire spring, thereby further ensuring that the tripped circuit breaker can be reset with both of the circuit breakers being in the open state.

In some embodiments, the wire spring further comprises a second bent section bent back from the pivotable end of the first bent section and comprising a fixed end at which the wire spring is fixed on the respective pushing member. In this way, the wire spring can be fixed on the pushing member easily.

In some embodiments, the movable end of the inclined section is bent to be partially around the second fastener. This arrangement can prevent the movable end of the inclined section from slipping off the second fastener during the movement.

In some embodiments, the bent protrusion is arranged between the limiting protrusion and the first fastener in the moving direction of the pushing member. This arrangement can further increase the force applied to the handle of the circuit breaker by the pin via the wire spring.

In a second aspect of the present disclosure, a dual-power transfer switch is provided. The dual-power transfer switch comprises a pair of circuit breakers for dual power sources; and a transfer apparatus as mentioned in the first aspect coupled to the pair of circuit breakers to control the pair of circuit breakers in a mutually different manner.

In a third aspect of the present disclosure, a method of assembling a transfer apparatus for a dual-power transfer switch is provided. The method comprises providing a pair of pushing members adapted to be moved in opposite directions to control circuit breakers for the dual-power transfer switch in a mutually different manner, each of the pair of pushing members comprising a limiting slot; rotatably arranging a transmission arm between the pair of pushing members; arranging a pair of pins on radial ends of the transmission arm, the pair of pins each adapted to slide in the respective limiting slot with a rotation of the transmission arm to drive the respective pushing member to move; and arranging a pair of elastic reset components on the pair of pushing members, each of the pair of elastic reset components adapted to be pressed by the respective pin during sliding of the pin to ensure the respective circuit breaker to be reset or switched into an open state with both of the circuit breakers being in the open state.

It is to be understood that the Summary is not intended to identify key or essential features of embodiments of the present disclosure, nor is it intended to be used to limit the scope of the present disclosure. Other features of the present disclosure will become easily comprehensible through the description below.

BRIEF DESCRIPTION OF THE DRAWINGS

The above and other objectives, features and advantages of the present disclosure will become more apparent through more detailed depiction of example embodiments of the present disclosure in conjunction with the accompanying drawings, wherein in the example embodiments of the present disclosure, same reference numerals usually represent the same components.

Throughout the drawings, the same or similar reference symbols are used to indicate the same or similar elements.

DETAILED DESCRIPTION

Figure 1:
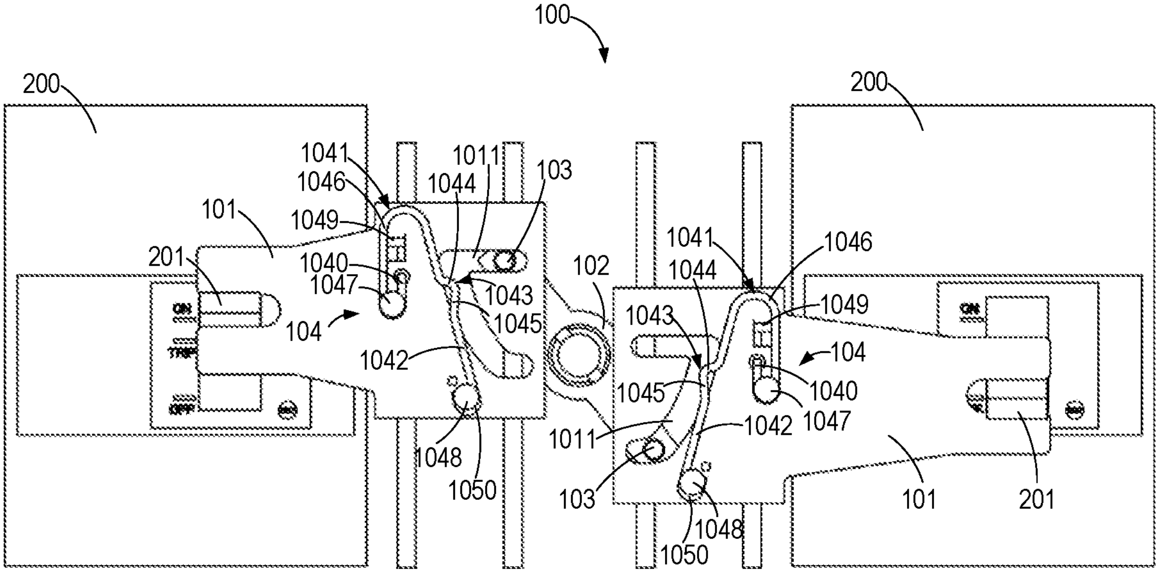
FIG. 1 shows a top view of a dual-power transfer switch with a transfer apparatus according to embodiments of the present disclosure, wherein the circuit breaker on the left is in a closed state and the circuit breaker on the right is in an open state.

The present disclosure will now be discussed with reference to several example embodiments. It is to be understood these embodiments are discussed only for the purpose of enabling those skilled persons in the art to better understand and thus implement the present disclosure, rather than suggesting any limitations on the scope of the subject matter.

As used herein, the term “comprises” and its variants are to be read as open terms that mean “comprises, but is not limited to.” The term “based on” is to be read as “based at least in part on.” The term “one embodiment” and “an embodiment” are to be read as “at least one embodiment.” The term “another embodiment” is to be read as “at least one other embodiment.” The terms “first,” “second,” and the like may refer to different or same objects. Other definitions, explicit and implicit, may be comprised below. A definition of a term is consistent throughout the description unless the context clearly indicates otherwise.

Conventional dual-power transfer switches typically comprise a pair of circuit breakers, each arranged between loads and a respective power source. The pair of circuit breakers is controlled by a transfer apparatus in a mutually different manner. That is, the transfer apparatus can control the pair of circuit breakers so that when one of the circuit breakers is in a closed state, the other one must be in an open state, and vice versa.

The conventional transfer apparatus typically comprises a pair of pushing members coupled to handles of the circuit breakers. The pair of pushing members can be moved by a transmission arm and a pair of pins arranged on radial ends of the transmission arm to move the handles in opposite directions to thereby control the circuit breakers. The transmission arm can be rotated manually or automatically. With a rotation of the transmission arm, each of the pair of pins slides in a respective limiting slot formed on the pushing member. In this way, the pushing members can be driven via the pins in opposite directions to respectively drive the handles of the circuit breakers. The two limiting slots arranged on the pair of pushing members are basically axisymmetric and each has a suitable shape to allow coordinated movements and interlocking of the pushing members.

For example, the limiting slot may have a horizontal straight section and an arc or inclined section connected to each other. When the pin slides in the horizontal straight section, the pin may press against the edge of the horizontal straight section to drive the pushing member to move. The arc section may be centered at a rotation center of the transmission arm. In this way, when the pin slides in the arc or inclined groove with the rotation of the transmission arm, the pushing member will not be moved and thus the circuit breaker can be maintained in the open state.

As well known, when the circuit connected to the circuit breaker has a fault such as a short circuit, the circuit breaker will be tripped. The transfer apparatus should be operated at this time to reset the tripped circuit breaker, for example, by switching it into an open state.

However, the tolerance range for the handle stroke of the circuit breaker is typically relatively wide, causing an insufficient accuracy for controlling the movement of the handle. As a result, the reset of the circuit breaker which only depends on the cooperation between the pin and the limiting slot may fail, causing a relatively low reliability of the reset action and thus the transfer apparatus. In this event, it is difficult for the tripped circuit breaker to be reset successfully to have both of the circuit breakers in the open state. Usually, the tripped circuit breaker can be reset successfully only when the other circuit breaker is switched to a closed state. This cannot fully meet the customer's needs, because some customers may need to successfully reset the tripped circuit breaker so that both circuit breakers are in open states. This problem cannot be solved only by adjusting the size or shape of the limiting slot of the pushing member.

In order to at least partially address the above and other potential problems, embodiments of the present disclosure provide a transfer apparatus 100 for a dual-power transfer switch and an associated transfer switch. Now some example embodiments will be described with reference to FIGS. 1-7.

Figure 2:
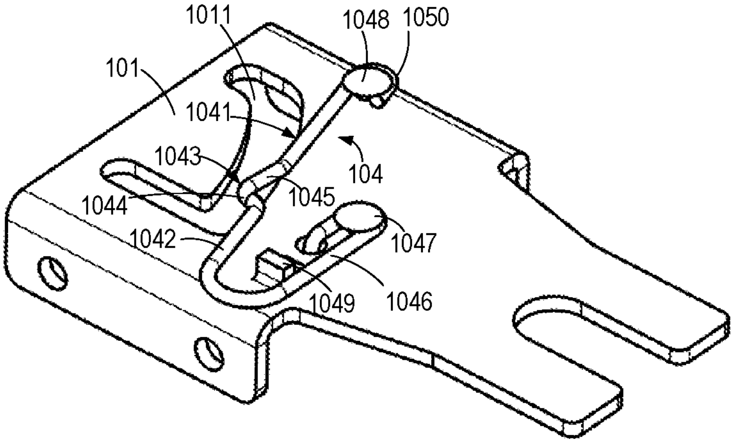
FIG. 2 shows a perspective view of a pushing member with an elastic reset component according to embodiments of the present disclosure.

FIG. 1 shows a top view of a dual-power transfer switch with a transfer apparatus 100, and FIG. 2 shows a perspective view of a pushing member 101 with an elastic reset component 104 according to embodiments of the present disclosure. As shown in FIGS. 1 and 2, besides the pushing members 101, pins 103 and the transmission arm 102 as mentioned above, the transfer apparatus 100 according to embodiments of the present disclosure further comprise a pair of elastic reset components 104 arranged on the pair of pushing members 101. During the sliding of the pin 103 in the respective limiting slot 1011, the pin 103 can press against the respective elastic reset component 104 to thereby apply a force to the handle 201 which is larger than a force required for moving the handle 201 into the open state. In this way, the tripped circuit breaker 200 can be ensured to be reset or switched into the open state, without having to switch another circuit breaker 200 into a closed state.

With the transfer apparatus 100 according to embodiments of the present disclosure, the tripped circuit breaker 200 can be reset so that both of the circuit breakers 200 are in the open state, which significantly improves the safety performance of the dual-power transfer switch. Furthermore, because only an elastic reset component 104 is needed to be arranged on the pushing member 101, the conventional dual-power transfer switch can be easily modified to obtain a more reliable transfer switch.

Furthermore, when the tripped circuit breaker 200 is reset or in the open state, the respective elastic reset component 104 can be further deformed to allow a further sliding of the pin 103. In this way, the pin 103 can further slide to an end of the limiting slot 1011 to provide a limit to the pushing member 101, to thereby prevent mis-operation of the circuit breaker 200 caused by accidental movement of the pushing member 101.

The elastic reset component 104 can achieve the above mentioned functions in any suitable structures or arrangements. In the following, only some example structures or arrangements of the transfer apparatus 100 for the dual-power transfer switch will be discussed with reference to FIGS. 1 to 7. Furthermore, due to the basically symmetrical structures and movement modes, the operations of the pushing members 101 on the left and right as shown in FIG. 1 are similar. For ease of description, the following will mainly take one of the pushing members 101, e.g., the pushing member 101 on the left, and the elastic reset component 104 thereon as an example to describe embodiments of the present disclosure. It is to be understood that the structure and movement mode of the other pushing member 101 and elastic reset component 104 are also similar, and will not be described separately in the following.

As shown in FIGS. 1 and 2, in some embodiments, each elastic reset component 104 may comprise a wire spring 1041 arranged on the respective pushing member 101. The wire spring 1041 has elastic deformation and recovery capabilities. The cross-section of the wire spring 1041 may have any suitable shape, for example, rectangular, circular, elliptical, or polygonal. In some embodiments, the wire spring 1041 may have an inclined section 1042 and a bent protrusion 1043 formed in the inclined section 1042, as shown in FIGS. 1 and 2. The inclined section 1042 may be inclined substantially along a part of the arc or inclined section 1042 of the limiting slot 1011. Specifically, the inclined section 1042 is inclined to gradually approach another pushing member 101 in a direction (will be called a first moving direction D1 for ease of discussion in the following) along which the pushing member 101 is moved to cause the respective circuit breaker 200 to be switched from a closed state to the open state.

The bent protrusion 1043 protrudes from the inclined section 1042. For example, the bent protrusion 1043 may be formed by bending a portion of the inclined section 1042, while other portions of the inclined section 1042 remain unchanged or unbent, so that the bent protrusion 1043 protrudes into the limiting slot 1011 when viewed in a direction perpendicular to the pushing member 101, as shown in FIG. 1. That is, the inclined section 1042 is arranged over the pushing member 101 and its projection towards the pushing member 101 falls in the limiting slot 1011. The pin 103 extends through the limiting slot 1011 from the bottom of the pushing member 101 to a position where it can interfere with the bent protrusion 1043. In this way, when the pin 103 slides in the limiting slot 1011, the pin 103 can press against the bent protrusion 1043 to apply the force to the handle 201 of the circuit breaker 200.

In some embodiments, the bent protrusion 1043 may comprise two inclined portions, namely, a first inclined portion 1044 and a second inclined portion 1045, connected to each other, as shown in FIGS. 1 and 2. The first inclined portion 1044 is bent to have a first angle with the inclined section 1042. With the first inclined portion 1044, when the pin 103 slides in a first direction, e.g., counterclockwise direction for the pin 103 on the left as shown in FIG. 1, the pin 103 can press against but not push away the first inclined portion 1044. This is because when the pin 103 slides in the first direction and begins to contact and press the first inclined portion 1044, due to factors such as the inclined direction of the inclined section 1042 and the angle of the first inclined portion 1044, etc., the force applied by the pin 103 on the first inclined portion 1044 will cause the wire spring 1041 to have a tendency to move to the right (for the wire spring 1041 on the left in FIG. 1).

This tendency will prevent the pin 103 from pushing away the first inclined portion 1044, but instead make the pin 103 continuously exert force to the first inclined portion 1044. The exerted force has a large downward component, i.e., in the first moving direction D1, which is finally applied to the handle 201 of the circuit breaker 200 through the pushing member 101, so that the circuit breaker 200 can be reset or switched into the open state. When the circuit breaker 200 is in the open state, i.e., the pushing member 101 cannot be moved anymore, with the further rotation of the transmission arm 102, the force applied by the pin 103 to the first inclined portion 1044 is gradually increased. The increased force will cause the wire spring 1041 to be further deformed and finally an end, i.e., a movable end, of the wire spring 1041 may be moved. In this way, the pin 103 can push away and thereby across the bent protrusion 1043 via the first inclined portion 1044 to thereby allow the pin 103 to slide further to the end of the limiting slot 1011.

The second inclined portion 1045 is bent to have a second angle with the inclined section 1042. The second angle is larger than the first angle. That is, when viewed along the extending direction of the inclined section 1042, the second inclined portion 1045 is flatter than the first inclined portion 1044. Due to factors such as the inclined direction of the inclined section 1042 and the angle of the second inclined portion 1045, when the pin 103 slides in a second direction opposite to the first direction, i.e., clockwise direction for the pin 103 on the left as shown in FIG. 1, the force applied by the pin 103 to the second inclined portion 1045 will cause a portion of the wire spring 1041 to be moved or deformed towards the left. As a result, the pin 103 can push away and cross the bent protrusion 1043 via the second inclined portion 1045 without moving the respective pushing member 101.

It can be seen from the above that the above actions of the wire spring 1041 have used the elastic properties of the wire spring 1041 to some extent. To enable the wire spring 1041 to provide more suitable deformation and elasticity, in some embodiments, as shown in FIGS. 1 and 2, the wire spring 1041 may further comprise a bent section, which will be called a first bent section 1046 in the following.

The first bent section 1046 is bent back from an end, i.e., a bending end, of the wire spring 1041 away from the movable end as mentioned above, and extends in the first moving direction D1 of the pushing member 101. As shown in FIGS. 1 and 2, the bending end of the inclined section 1042 is the end further away from another pushing member 101 than the movable end of the inclined section 1042. In this way, the inclined section 1042 and the first bent section 1046 may form a reversed U-shape to thereby provide a more suitable deformation and elasticity when the pin 103 presses against the bent protrusion 1043.

To ensure that the pin 103 presses against but not pushes away the first inclined portion 1044 when sliding in the first direction while directly pushing away the second inclined portion 1045 when sliding in the second direction, two fasteners, i.e., a first fastener 1047 and a second fastener 1048, for arranging the wire spring 1041 and a limiting protrusion 1049 may be provided in some embodiments. The fastener herein may refer to the fastener itself, such as rivets, screws, etc., or it can refer to the fastening method used to arrange the wire spring 1041 to the pushing member 101, such as welding.

In some embodiments, the first fastener 1047 is arranged to pivotably fix a pivotable end of the first bent section 1046 which is away from the bending end of the inclined section 1042. The first fastener 1047 can allow the portions nearby the pivotable end to slightly pivot about the first fastener 1047 when the pin 103 pushes away the second inclined portion 1045. The limiting protrusion 1049 protrudes from the pushing member 101 and is arranged between the first bent section 1046 and the inclined section 1042 and nearby the first bent section 1046, as shown in FIG. 1.

As mentioned above, when the pin 103 slides in the first direction and begins to contact and press the first inclined portion 1044, the force applied by the pin 103 to the first inclined portion 1044 will cause the wire spring 1041 to have a tendency to move to the right (for the wire spring 1041 on the left in FIG. 1). The limiting protrusion 1049 can prevent the movement of the wire spring 1041, and more specifically a movement of the first bent section 1046, to the right, so that with the rotation of the transmission arm 102, the pin 103 can apply a larger force to the handle 201 of the circuit breaker 200 to ensure the circuit breaker 200 can be reset and switched into the open state. That is, the limiting protrusion 1049 can further increase the force applied to the handle 201 of the circuit breaker 200.

The inventors have discovered that if the bent protrusion 1043 is arranged between the limiting protrusion 1049 and the first fastener 1047 and closer to the first fastener 1047 in the moving direction of the pushing member 101, as shown in FIG. 1, the force applied by the pin 103 to the handle 201 of the circuit breaker 200 may be further increased. Thus, in some embodiments, the bent protrusion 1043 is arranged between the limiting protrusion 1049 and the first fastener 1047 and closer to the first fastener 1047 to obtain an increased force applied to the handle with the wire spring 1041. It is to be understood that the position of the bent protrusion 1043 relative to the limiting protrusion 1049 and the first fastener 1047 as shown in FIG. 1 are merely illustrative, without suggesting any limitation as to the scope of the present disclosure. As long as the force applied by the pin 103 via the wire spring 1041 is large enough to make the circuit breaker 200 into the open state, any suitable positions or locations of the bent protrusion 1043 is also possible.

In some embodiments, the wire spring 1041 may further comprise a second bent section 1040 which is bent back from the pivotable end of the first bent section 1046. The second bent section 1040 has a fixed end away from the pivotable end. The wire spring 1041 is fixed on the pushing member 101 by inserting the fixed end into a hole formed on the pushing member 101.

The second fastener 1048 is arranged at the movable end of the inclined section 1042. As mentioned above, when the circuit breaker 200 is in the open state, with the further rotation of the transmission arm 102, the force applied by the pin 103 to the first inclined portion 1044 is gradually increased. The increased force will cause the wire spring 1041 to be further deformed and finally the movable end of the inclined section 1042 may be moved.

To prevent the movable end of the inclined section 1042 from slipping off the second fastener 1048 during the movement, the movable end of the inclined section 1042 is bent to form a substantially U-shape to partially around the second fastener 1048, as shown in FIG. 1. In this way, after the pin 103 crosses the bent protrusion 1043, the wire spring 1041 will return to its initial shape or position and the movable end of the inclined section 1042 also can return back along the U-shape thereof.

In the following, the process of the dual-power transfer switch being manually operated and reset by means of the transfer apparatus 100 according to embodiments of the present disclosure will be described with reference to FIGS. 3-6. It is to be understood that the dual-power transfer switch may also be operated automatically, which will not be repeated in the following. It is to be understood that this process is equally effective for the operation of switching one of the circuit breakers from a closed state to an open state, and vice versa, which will not repeated in the following as well.

Figure 3:
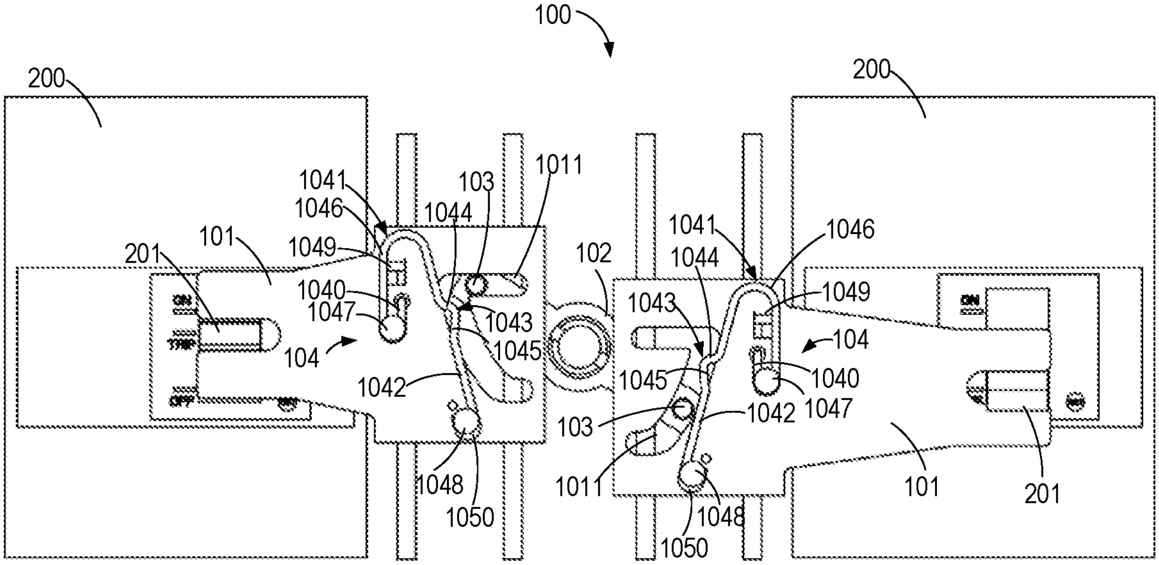
FIG. 3 shows a top view of a dual-power transfer switch with a transfer apparatus according to embodiments of the present disclosure, wherein the circuit breaker on the left is in a tripped state and the circuit breaker on the right is in an open state.
Figure 4:
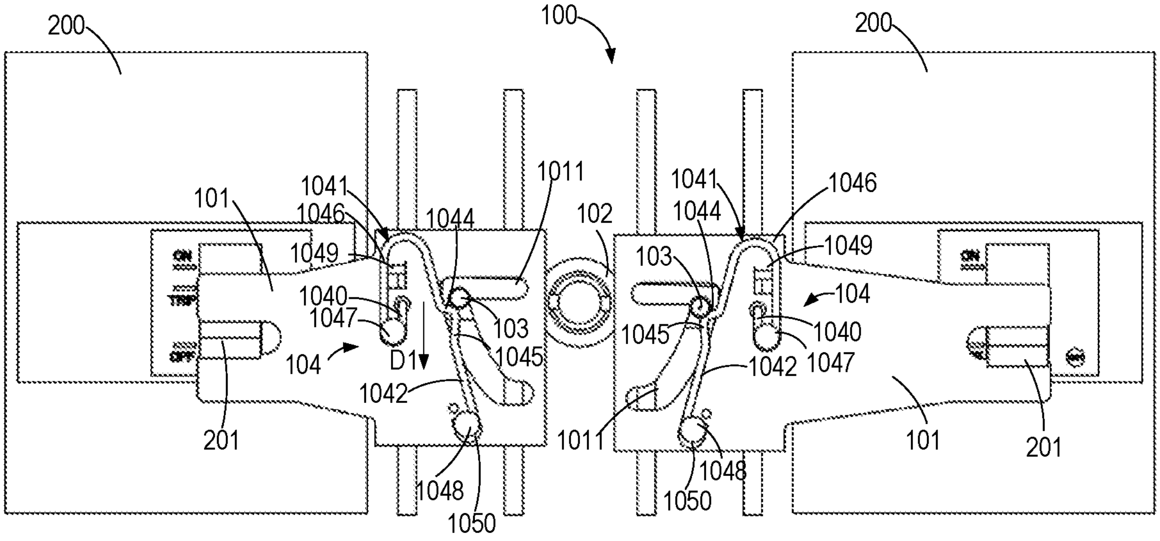
FIG. 4 shows a top view of a dual-power transfer switch with a transfer apparatus according to embodiments of the present disclosure, wherein the circuit breaker on the left is in an open state and the circuit breaker on the right is in an open state.

FIG. 3 shows that the circuit breaker 200 on the left is tripped e.g., due to a failure such as short-circuit on the load side. To manually reset the tripped circuit breaker 200, a user may rotate the transmission arm 102 counterclockwise. With the rotation of the transmission arm 102, the pin 103 on the right will first contact and push the second inclined portion 1045 of the wire spring 1041 without moving the pushing member 101 on the right. In the meantime, the pin 103 on the left begins to contact and press the first inclined direction, as shown in FIG. 4. With the further rotation of the transmission arm 102, the force applied by the pin 103 to the first inclined portion 1044 has a component along a first moving direction D1 to cause the pushing member 101 on the left to move downward.

In this way, the handle 201 of the circuit breaker 200 is moved to cause the circuit breaker 200 to be reset or switched into the open state. At this time, the circuit breakers 200 on the left and right as shown in FIG. 4 are both in the open state. Thus, with the transfer apparatus 100 according to embodiments of the present disclosure, the circuit breaker 200 can be reset with both of the circuit breakers 200 being in open states. In this way, the user can safely handle the fault on the load side.

Figure 5:
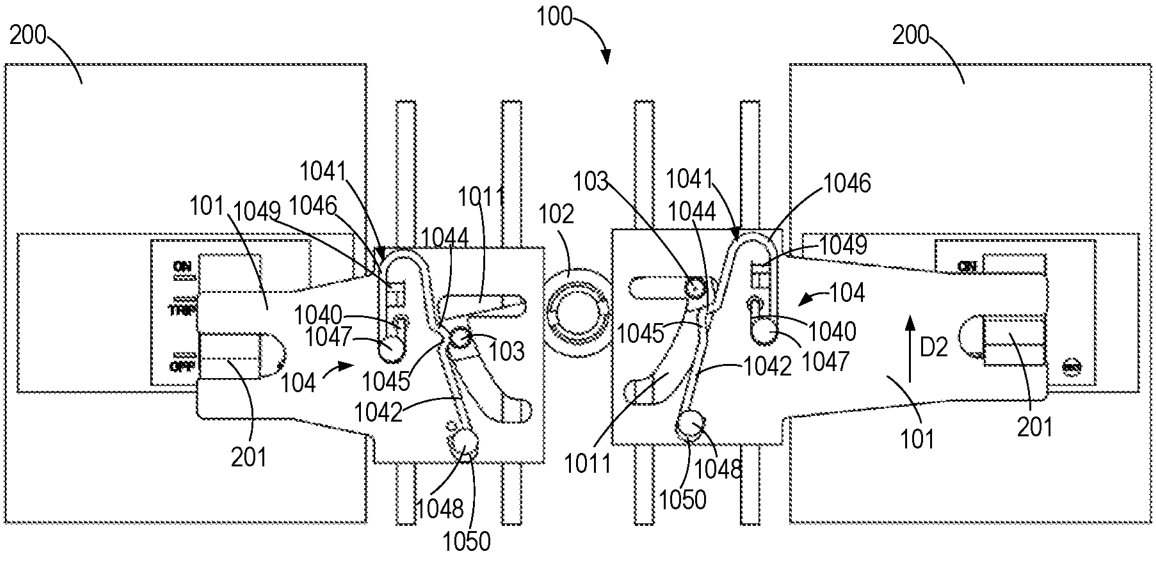
FIG. 5 shows a top view of a dual-power transfer switch assembly with a transfer apparatus according to embodiments of the present disclosure, wherein the pin on the left pushing member is pushing away and crossing bent protrusion.
Figure 6:
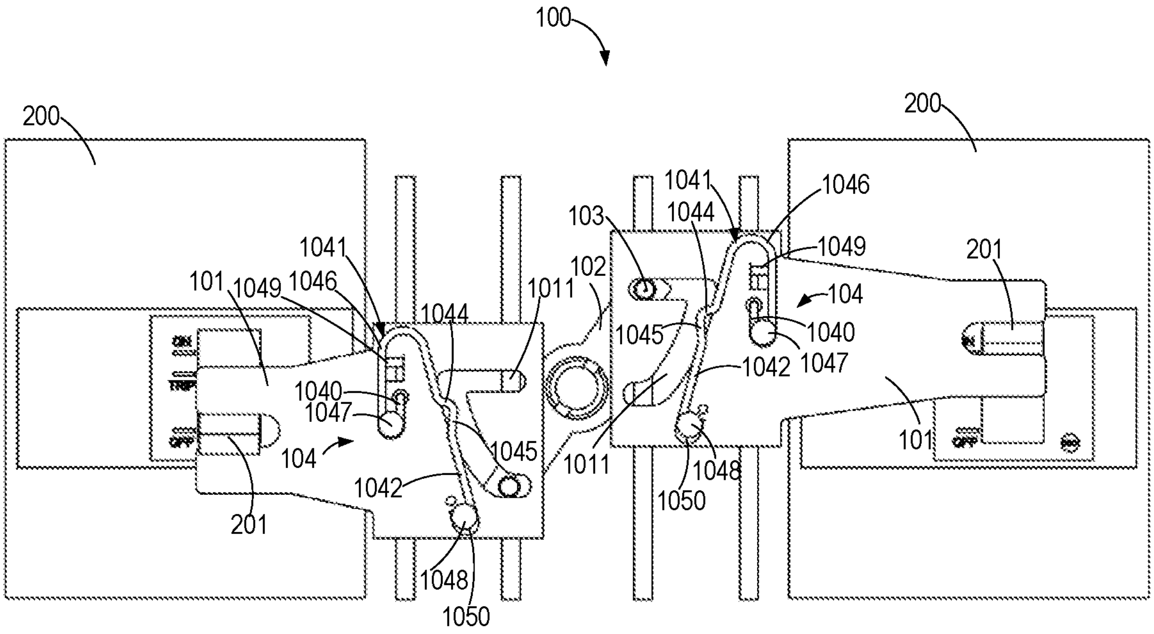
FIG. 6 shows a top view of a dual-power transfer switch assembly with a transfer apparatus according to embodiments of the present disclosure, wherein the circuit breaker on the left is in an open state and the circuit breaker on the right is in a closed state.

After the fault on the load side is cleared, the user may further rotate the transmission arm 102 counterclockwise to use the secondary power source controlled by the circuit breaker 200 on the right to power the loads. With the further rotation of the transmission arm 102, the pin 103 on the right will begin to contact and push the upper edge of the horizontal straight section of the limiting slot 1011 and thereby push the pushing member 101 to move in a second moving direction D2 which is opposite to the first moving direction D1, as shown in FIGS. 4 and 5, and eventually make the circuit breaker 200 on the right into the closed state, as shown in FIG. 6.

In the meantime, the pin 103 on the left will continuously exert the increased force on the first inclined portion 1044 of the wire spring 1041 on the left, but the pushing member 101 cannot be moved downward anymore. When the force applied on the first inclined portion 1044 exceeding a predetermined value, the wire spring 1041 will be deformed and the movable end thereof will be moved along the inclined direction of the inclined section 1042. In this way, the pin 103 can push away and cross the bent protrusion 1043, and eventually move to a lower end of the limiting slot 1011, as shown in FIGS. 5 and 6. At this time, the circuit breaker 200 on the left can be maintained in the open state while the circuit breaker 200 on the right can be maintained in the closed state.

It is to be understood that the above embodiments where the transmission arm 102 is further counterclockwise rotated to cause the circuit breaker 200 on the right to be closed are merely illustrative, without suggesting any limitation as to the scope of the present disclosure. After the tripped circuit breaker 200 on the left is reset by counterclockwise rotation of the transmission arm 102, as shown in FIG. 4, the user may also rotate the transmission arm 102 clockwise to cause the circuit breaker 200 on the left to be in the closed state. The process is similar to the above, and will not be repeated in the following.

The above embodiments use the tripping of the circuit breaker 200 on the left as an example to describe how to use the transfer apparatus 100 according to embodiments of the present disclosure to operate the transfer switch to reset and close the circuit breakers 200. It is be understood that the closing, tripping and reset process of the circuit breaker 200 on the right is exactly the same as that of the circuit breaker 200 on left as shown in FIGS. 3-6, and will not be repeated in the following.

Figure 7:
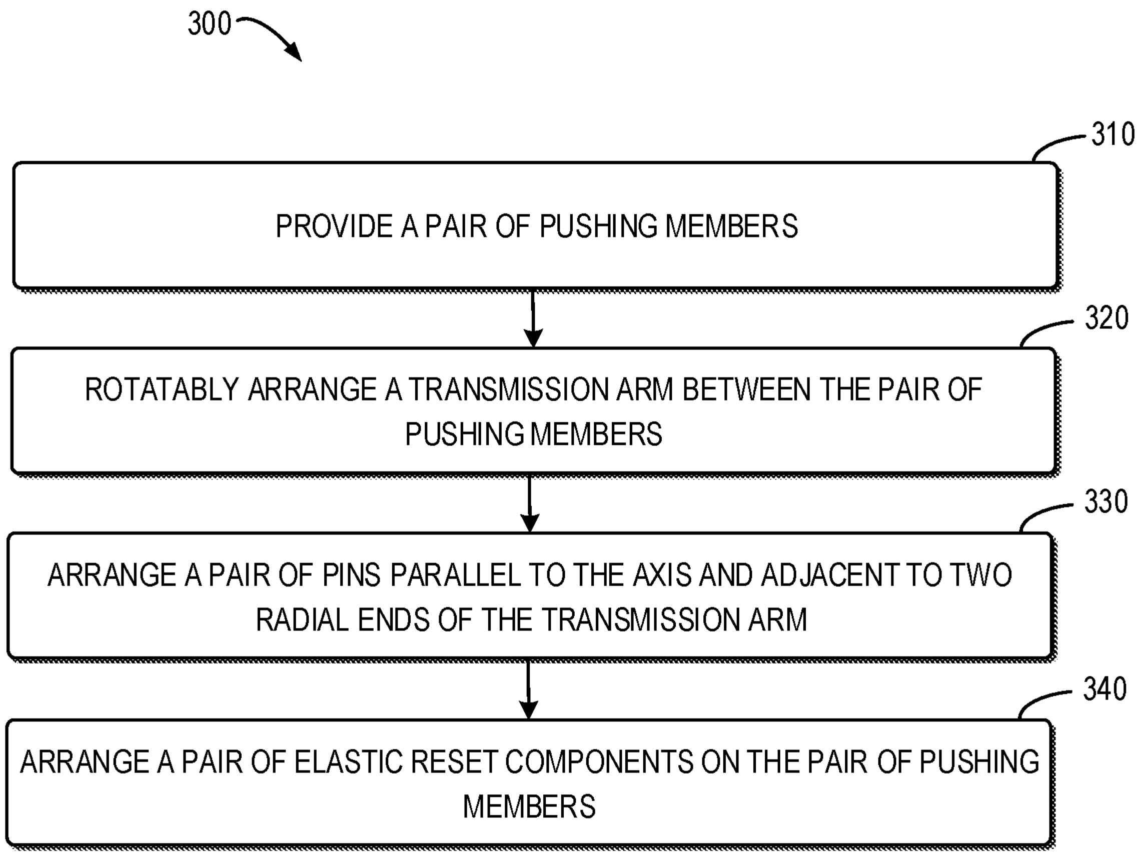
FIG. 7 shows a flowchart illustrating a method of assembling a transfer apparatus for a dual-power transfer switch assembly according to embodiments of the present disclosure.

According to other aspects of the present disclosure, a method 300 of assembling a transfer apparatus 100 for a dual-power transfer switch is provided. FIG. 7 shows a flowchart illustrating a method of assembling a transfer apparatus 100 for a dual-power transfer switch according to embodiments of the present disclosure. As shown in FIG. 7, in block 310, a pair of pushing members 101 are provided. The pair of pushing members 101 can be moved in opposite directions to control the circuit breakers 200 of the dual-power transfer in a mutually different manner.

In block 320, a transmission arm 102 is rotatably arranged between the pair of pushing members 101. In block 330, a pair of pins 103 are arranged on radial ends of the transmission arm 102. In block 340, a pair of elastic reset components 104 are arranged on the pair of pushing members 101. Each pin 103 can slide in the respective limiting slot 1011 with a rotation of the transmission arm 102 to thereby drive the pushing member 101 to move. During the sliding of the pin 103, the elastic reset component 104 is pressed by the pin 103 to thereby ensure the circuit breaker 200 to be reset or switched into the open state.

It is to be understood that while method 300 describes a series of operations that are performed in a sequence, method 300 is not limited by the order of the sequence depicted. For instance, some operations may occur in a different order than that described. In addition, one operation may occur concurrently with another operation. In some embodiments, not all operations described are performed. In some embodiments, not all operations performed are illustrated.

According to other aspects of the present disclosure, a dual-power transfer switch is provided. The dual-power transfer switch comprises a pair of circuit breakers 200 for dual power sources and a transfer apparatus 100 as mentioned above. With transfer apparatus 100 as mentioned above, the tripped circuit breaker 200 can be reset with both of the circuit breakers 200 being in the open state, thereby improving the safety performance of the dual-power transfer switch.

It should be appreciated that the above detailed embodiments of the present disclosure are only for exemplifying or explaining principles of the present disclosure and do not limit the present disclosure. Therefore, any modifications, equivalent alternatives and improvements, etc. without departing from the spirit and scope of the present disclosure shall be comprised in the scope of protection of the present disclosure. Meanwhile, appended claims of the present disclosure aim to cover all the variations and modifications falling under the scope and boundary of the claims or equivalents of the scope and boundary.

What is claimed is:

1. A transfer apparatus for a dual-power transfer switch, comprising:
- a pair of pushing members adapted to be moved in opposite directions to control circuit breakers for the dual-power transfer switch in a mutually different manner, each of the pair of pushing members comprising a limiting slot;
- a transmission arm rotatably arranged between the pair of pushing members;
- a pair of pins arranged on radial ends of the transmission arm and each adapted to slide in the respective limiting slot with a rotation of the transmission arm to drive each respective pushing member of the pair of pushing members to move; and
- a pair of elastic reset components arranged on the pair of pushing members, wherein:
  - a first elastic reset component of the pair of elastic reset components being arranged on a first pushing member of the pair of pushing members,
  - a second elastic reset component of the pair of elastic reset components being arranged on a second pushing member of the pair of pushing members, and
  - each of the first elastic reset component and the second elastic reset component is adapted to be pressed by each respective pin during sliding of each respective pin to ensure that each respective circuit breaker of the circuit breakers is reset or switched into an open state.

2. A dual-power transfer switch, comprising:
- a pair of circuit breakers for dual power sources; and
- a transfer apparatus of claim 1 coupled to the pair of circuit breakers to control the pair of circuit breakers in a mutually different manner.

3. The transfer apparatus of claim 1, wherein each of the first elastic reset component and the second elastic reset component comprises
- a wire spring arranged comprising an inclined section and a bent protrusion.

4. The transfer apparatus of claim 3, wherein the bent protrusion comprises:
- a first inclined portion bent to have a first angle with the inclined section and adapted to be pressed by the pin when the pin moves in a first direction to allow the pin to apply a force to a handle; and
- a second inclined portion bent to have a second angle larger than the first angle with the inclined section and adapted to be pushed away by the pin to cross the bent protrusion without causing one of the pair of pushing members to move.

5. The transfer apparatus of claim 4, wherein at least one of the pins is further adapted to, when one of circuit breakers is in the open state, push away and cross the bent protrusion via the first inclined portion with further rotation of the transmission arm.

6. The transfer apparatus of claim 5, wherein the wire spring further comprises:
- a first bent section bent back from a bending end of the inclined section and extending in the first moving direction of one of the pushing members, the bending end of the inclined section being further away from another pushing member than a movable end of the inclined section away from the bending end.

7. The transfer apparatus of claim 6, wherein each of the pair of elastic reset components further comprises:
- a first fastener arranged to pivotably fix a pivotable end of the first bent section away from the bending end of the inclined section; and
- a second fastener arranged at the movable end of the inclined section and adapted to allow the movable end to move along an inclined direction of the inclined section.

8. The transfer apparatus of claim 6, wherein each of the pair of elastic reset components further comprises:
- a limiting protrusion protruding from at least one of pair of the pair of pushing members and arranged between the first bent section and the inclined section, the limiting protrusion adapted to stop the first bent section when the pin is in contact with the first inclined portion.

9. The transfer apparatus of claim 7, wherein the wire spring further comprises:
- a second bent section bent back from the pivotable end of the first bent section and comprising a fixed end at which the wire spring is fixed on at least one of the pair of pushing members.

10. The transfer apparatus of claim 7, wherein the movable end of the inclined section is bent to be partially around the second fastener.

11. The transfer apparatus of claim 8, wherein the bent protrusion is arranged between the limiting protrusion and a first fastener in the moving direction of at least one of the pair of pushing members.

12. A method of assembling a transfer apparatus for a dual-power transfer switch assembly, comprising:
- providing a pair of pushing members adapted to be moved in opposite directions to control circuit breakers for the dual-power transfer switch in a mutually different manner, each of the pair of pushing members comprising a limiting slot;
- rotatably arranging a transmission arm between the pair of pushing members;
- arranging a pair of pins on radial ends of the transmission arm, the pair of pins each adapted to slide in the respective limiting slot with a rotation of the transmission arm to drive the respective pushing member to move; and
- arranging a pair of elastic reset components on the pair of pushing members, wherein:
  - a first elastic reset component of the pair of elastic reset components being arranged on a first pushing member of the pair of pushing members,
  - a second elastic reset component of the pair of elastic reset components being arranged on a second pushing member of the pair of pushing members, and
  - each of the pair of elastic reset components adapted to be pressed by each respective pin during sliding of each respective pin to ensure that each respective circuit breaker of the circuit breakers be reset or switched into an open state with both of the circuit breakers being in the open state.

13. The dual-power transfer switch of claim 2, wherein each of the pair of elastic reset components of the transfer apparatus comprises:
- a wire spring arranged on the respective pushing member and comprising:
  - an inclined section inclined to gradually approach another pushing member in a first moving direction along which the pushing member is moved to cause the respective circuit breaker to be switched from a closed state to the open state; and a bent protrusion protruding from the inclined section and adapted to be pressed by the respective pin during the sliding of the pin.

14. The dual-power transfer switch of claim 13, wherein the bent protrusion of the transfer apparatus comprises:

a first inclined portion bent to have a first angle with the inclined section and adapted to be pressed by the pin when the pin moves in a first direction to allow the pin to apply a force to a handle; and a second inclined portion bent to have a second angle larger than the first angle with the inclined section and adapted to be pushed away by the pin when the pin moves in a second direction opposite to the first direction to allow the pin to cross the bent protrusion without causing one of the pair of pushing members to move.

15. The dual-power transfer switch of claim 14, wherein each pin of the pairs of pins of the transfer apparatus is further adapted to, when one of the circuit breakers is in the open state, push away and cross the bent protrusion via the first inclined portion with further rotation of the transmission arm.

16. The dual-power transfer switch of claim 15, wherein the wire spring of the transfer apparatus further comprises:

a first bent section bent back from a bending end of the inclined section and extending in the first moving direction of one of the pair of pushing members, the bending end of the inclined section being further away from another pushing member than a movable end of the inclined section away from the bending end.

17. The dual-power transfer switch of claim 16, wherein each of the pair of elastic reset components of the transfer apparatus further comprises:

a limiting protrusion protruding from the respective pushing member and arranged between the first bent section and the inclined section, the limiting protrusion adapted to stop the first bent section when the pin is in contact with the first inclined portion.

18. The dual-power transfer switch of claim 16, wherein each of the pair of elastic reset components of the transfer apparatus further comprises:

a first fastener arranged to pivotably fix a pivotable end of the first bent section away from the bending end of the inclined section; and a second fastener arranged at the movable end of the inclined section and adapted to allow the movable end to move along an inclined direction of the inclined section.

19. The dual-power transfer switch of claim 18, wherein the wire spring of the transfer apparatus further comprises:

a second bent section bent back from the pivotable end of the first bent section and comprising a fixed end at which the wire spring is fixed on at least one of the pair of pushing members.

20. The dual-power transfer switch of claim 18, wherein the movable end of the inclined section of the transfer apparatus is bent to be partially around the second fastener.

* * * * *